United States Patent [19]
Shackle et al.

[11] Patent Number: 6,083,475
[45] Date of Patent: Jul. 4, 2000

[54] METHOD FOR MAKING LITHIATED METAL OXIDE

[75] Inventors: Dale R. Shackle, Morgan Hill; Benjamin Chaloner-Gill, San Jose, both of Calif.

[73] Assignee: Rentech, Inc., San Jose, Calif.

[21] Appl. No.: 09/285,552

[22] Filed: Apr. 2, 1999

[51] Int. Cl.[7] .............................. C01D 1/02; C01G 31/02; C01G 45/02
[52] U.S. Cl. ............................................ 423/593; 423/599
[58] Field of Search ................................. 423/50, 64, 65, 423/179.5, 184, 599, 593; 429/224, 231.2

[56] References Cited

U.S. PATENT DOCUMENTS

| | | |
|---|---|---|
| 3,642,436 | 2/1972 | Smith, Jr. . |
| 3,769,092 | 10/1973 | Dechenaux . |
| 3,836,403 | 9/1974 | Gaines . |
| 3,898,096 | 8/1975 | Herédy et al. . |
| 4,009,052 | 2/1977 | Whittingham . |
| 4,091,191 | 5/1978 | Gaines . |
| 4,218,523 | 8/1980 | Kalnoki-Kis . |
| 4,284,692 | 8/1981 | Rao et al. . |
| 4,301,221 | 11/1981 | Basu et al. . |
| 4,410,609 | 10/1983 | Peled et al. . |
| 4,522,901 | 6/1985 | Shacklette . |
| 4,655,828 | 4/1987 | Yates et al. . |
| 4,857,423 | 8/1989 | Abraham et al. . |
| 4,885,378 | 12/1989 | Band et al. . |
| 4,910,294 | 3/1990 | Ogata et al. . |
| 4,911,996 | 3/1990 | Holleck et al. . |
| 4,983,476 | 1/1991 | Slane et al. . |
| 5,039,582 | 8/1991 | Pistoia . |
| 5,229,227 | 7/1993 | Webber . |
| 5,266,299 | 11/1993 | Tarascon . |
| 5,298,349 | 3/1994 | Takeuchi . |
| 5,432,030 | 7/1995 | Vourlis . |
| 5,500,291 | 3/1996 | Minami et al. . |
| 5,514,491 | 5/1996 | Webber . |
| 5,520,903 | 5/1996 | Chang et al. . |
| 5,549,880 | 8/1996 | Koksbang . |
| 5,582,623 | 12/1996 | Chu . |
| 5,597,664 | 1/1997 | Ellgen . |
| 5,605,773 | 2/1997 | Ellgen . |
| 5,639,438 | 6/1997 | Ellgen . |
| 5,686,201 | 11/1997 | Chu . |
| 5,744,265 | 4/1998 | Barker et al. . |
| 5,789,108 | 8/1998 | Chu . |
| 5,955,052 | 9/1999 | Padhi et al. . |

OTHER PUBLICATIONS

S. Megahed and B. Scrosati The Electrochemical Society Interface Winter 1995 pp. 34–39 Rechargeable Nonaqueous Batteries.

G. Pistoia, S. Panero, M. Tocci And R.V. Moshtev and V. Manev Solid State Ionics 13 (1984) pp. 311–318 Solid Solutions $Li_{1+x}V_3O_8$ As Cathodes For High Secondary Li Batteries.

G. Pistoia, M. Pasquali, M. Tocci And R.V. Moshtev and V. Manev Journal of Power Sources. 15 (1985) pp. 13–25 Lithium Vanadium Oxide Secondary Batteries Evaluation Of Factors Affecting The Performance Test Cells [Full title not legible).

(List continued on next page.)

*Primary Examiner*—Steven P. Griffin
*Assistant Examiner*—Christina Ildebrando
*Attorney, Agent, or Firm*—Graham & James LLP

[57] ABSTRACT

The present invention is a simple and reliable method for producing lithiated metal oxides such as those useful as cathode materials in lithium ion electrochemical cells. The method is based on the use of an organic solvent that dissolves both lithium sulfide and elemental sulfur without dissolving the metal oxide or the lithiated product. Lithium sulfide and the metal oxide as a powder are refluxed in the organic solvent under an inert atmosphere. The organic solvent dissolves the lithium sulfide and the dissolved sulfide reduces the metal oxide allowing the intercalation of lithium. At the same time the sulfur that results from the oxidation-reduction reaction is carried away by the solvent thereby promoting the reaction and preventing contamination of the product with sulfur.

11 Claims, 9 Drawing Sheets

OTHER PUBLICATIONS

Robert Schöllhorn, Franz Klein–Reesink, and Renate Reimold Formation, Structure, And Topotactic Exchange Reactions Of The Layered Hydrogen Bronze $H_x V_3 O_3$ J.C.S. Chem. Comm., 1979.

F. Bonino, M. Ottaviani, and B. Scrosati and G. Pistoia, vol. 135, No. 1, pp 12–15 A Polymeric Electrolyte Rechargeable Lithium Battery.

S. Panero, M. Pasquali, and G. Pistoia Journal of The Electrochemical Society pp. 1225–1227 Accelerated Brief Communications May 1983 Rechargeable Li/Li$_{1+x}$V$_3$O$_8$ Cells.

Bruno Scrosati, Alessandro Selvaggi, Fausto Croce and Wang Gang Journal of Power Sources, 24 (1988) 287–294 The Li/LiV$_3$O$_8$ Polymer Electrolyte Lithium Battery III. Investigation Of The Electrode Interfaces.

K. Nassau and D.W. Murphy Journal of Non–Crystalline 44 (1981) pp. 297–304 North–Holland Publishing Company The Quenching And Electrochemical Behavior Of Li$_2$O–V$_2$O$_5$ Glasses.

K. West, B. Zachau–Christiansen, M.J.L. Ostergard and T. Jacobsen Journal of Power Sources, 20 (1987) 165–172 Vanadium Oxides As Electrode Materials For Rechargeable Lithium Cells.

A.D. Wadsley Acta Cryst. (1957). 10, 261 pp. 261–267 Crystal Chemistry Of Non–Stoichiometric Pentavalent Vanadium Oxides:Crystal Structure Of Li$_{1+x}$V$_3$O$_8$.

Ian D. Raistrick Solid State Ionics 9&10 (1983) 425–430 North–Holland Publishing Company Lithium Insertion Reactions Intungsten And Vanadium Oxide Bronzes.

METHOD FOR MAKING LITHIATED METAL OXIDE

BACKGROUND OF THE INVENTION

1. Field of the Invention

The present application generally concerns the field of novel synthetic methods for producing metallic inorganic compounds and more specifically concerns synthesis of lithium containing materials suitable for use in rechargeable electric cells.

2. Description of Related Art

The current expansion in the widespread use of portable electronic devices ranging from dvd (digital video disk) players and cellular telephones to PDAs (personal digital assistants) and laptop computers has greatly increased the demand for a rechargeable battery with high energy storage density. Such portable electronic devices require batteries that are light in weight and yet store a large amount of energy so that the devices can operate for a long period between recharging. In addition, the ideal battery should be exhibit a short recharge cycle time and be capable of a large number of recharge cycles before energy density or other characteristics deteriorate. Although disposable batteries, such as alkaline power cells, can be used in many of these devices, convenience and disposal problems generally mitigate against throw away batteries.

At first blush it might seem that a quick look at chemical potential tables could solve the problem of selecting ideal anode and cathode materials for a chemical cell. After all, by comparing half-cell potentials of candidate materials with the density of the material, one should be able to select cathode and anode materials with favorable weight properties. Lithium, the lightest of the metals, has the highest specific energy capacity of the practical materials and is a natural choice for use in chemical cells. However, simple half-cell comparisons reveal the electrical potential of a combination but says nothing about the overall properties of a cell. Even when a combination with high energy storage is developed, that combination may produce a cell that can be effectively recharged only a few times. The electrodes may deform or otherwise change, e.g., by dendrite formation, during the charging and discharging cycle. The chemical reactions may not be truly reversible resulting in loss of potential or energy storage with each recharge cycle.

Consequently, considerable research has been devoted to the design of advanced high capacity rechargeable battery systems. Currently many of the most promising systems under development use an alkali metal as the negative electrode (anode). Alkali metals combine high standard electrode potential with high energy capacity and high reactivity. This high reactivity results in nonstandard (as compared to traditional chemical cells) configurations. In particular, the standard aqueous electrolytes are replaced with solid or liquid nonaqueous materials. This may results in "different" electrolytes such as molten lithium chloride, lithium bromine and potassium bromide. Such high temperature electrolytes are not suitable for consumer electronics.

However, nonaqueous lithium ion batteries do appear to have the required characteristics for consumer use. These batteries are based on a lithium-ion intercalation anode, a lithium ion containing electrolyte, and a lithium-ion intercalation cathode. It turns out that lithium-ion accepting materials are not always easy to produce. These materials should be open-structured so as to be capable of readily accepting (during discharge) and releasing (during recharge) lithium ions. This generally means that the cathode materials must have a crystal lattice into which or out of which the lithium ions can readily move. Further, the materials typically have a layered or porous structure so that the ions can easily and rapidly move in and out. Further, these materials must maintain this structure through many charging and discharging cycles. It is likely that efflux and influx of ions will result in dimensional changes, but such changes are kept to a minimum in ideal materials.

The most studied cathode materials have been dichalcogenides of transition metals (e.g. titanium sulfide ($TiS_2$)) or transition metal oxides (e.g. vanadium oxide ($V_6O_{13}$)). These materials can form lithium-intercalated compounds that are capable of rapid and highly reversible chemical reactions. However, they must first be lithiated before use in a lithium ion battery system. In actual practice only a limited number of these compounds have thus far proven useful for lithium ion systems. In fact, only three types of materials are in common use, lithium manganese oxide ($LiMn_2O_4$), lithium cobalt oxide ($LiCoO_2$), lithium nickel oxide ($LiNiO_2$), and mixtures thereof. These compounds are limited to an energy storage density of between 100 and 180 mAh/g (about 280–504 mWh/g). It is an object of the present invention to provide simple and reproducible methods of producing other lithium-containing cathode materials that have a higher energy density than the above mentioned lithiated cathode materials.

SUMMARY OF THE INVENTION

The present invention is a simple and reliable method for producing lithiated metal oxides such as those useful as cathode materials in lithium ion electrochemical cells. The method is based on the use of an organic solvent that dissolves both lithium sulfide and elemental sulfur without dissolving the metal oxide or the lithiated product. Lithium sulfide and the metal oxide as a powder are refluxed in the organic solvent under an inert, dry atmosphere. The organic solvent dissolves the lithium sulfide and the dissolved sulfide reduces the metal oxide allowing the intercalation of lithium. At the same time the sulfur that results from the oxidation-reduction reaction is carried away by the solvent thereby promoting the reaction and preventing contamination of the product with sulfur.

This process will work with a variety of metal oxides as long as the metal's redox potential is such to permit reduction by sulfide. A variety of organic solvents are useable with acetonitrile, "glyme" ethers and tetrahydrofuran being preferred. Refluxing allows simple temperature control since the solvents boiling point essentially sets the reaction temperature. Also it is simple to conduct the refluxing under an inert atmosphere thereby alleviating the necessity to provide a large excess of reducing agent. Solubility of lithium sulfide and sulfur in the organic solvent considerably simplifies clean up of the reaction product since both excess lithium sulfide and sulfur can be readily washed away.

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the general principles of the present invention have been defined herein specifically to provide improved lithium-containing cathode materials and methods for making these materials.

While a number of cathode materials are known to exhibit high energy capacity in lithium metal type batteries, these compounds do not contain lithium in a form that yields readily replaceable lithium ions. Therefore, these materials are not useful in a lithium ion battery. However, materials that are properly lithiated do yield removable lithium ions and are useful in lithium ion batteries.

The chemical reaction upon which the current invention is based is shown as equation (1). In this reaction lithium sulfide ($Li_2S$) is mixed with an appropriate metal oxide in the presence of an organic solvent to yield a lithiated metal oxide and free sulfur. The choice of solvent is an important aspect of the invention. An ideal solvent will dissolve both lithium sulfide and sulfur while not dissolving either the metal oxide or the resulting lithiated metal oxide. Suitable organic solvents include acetonitrile and glyme (ethyleneglycol dimethyl ether) and other ethers of the "glyme" family (e.g., ethylene glycol diethyl ether, diethyleneglycol dimethyl ether, triethylene glycol dimethyl ether, tetraethylene glycol dimethyl ether, and poly(ethylene glycol) dimethyl ether.

(1)

$$Li_2S + \text{Metal Oxide} \longrightarrow \text{LiMetal Oxide} + S$$

In the reaction of the present invention the metal of the metal oxide is reduced by the sulfide. Therefore, only those metals with the a redox potential below sulfide function properly. Lithium sulfide must be at least slightly soluble (about 1% or greater) in the solvent for the reaction to occur at a reasonable rate. Sulfur must be sufficiently soluble for the organic solvent to dissolve and remove it otherwise the product material will be unusable due to sulfur contamination. A slight excess of lithium to the metal (1.05:1) is desirable to ensure complete reaction. Using a greater excess of lithium simply results in waste. The temperature of the reaction is set by the boiling temperature of the solvent. Although the reaction occurs over a wide range of temperatures, best results occur between 60° C. and 100° C. Below that temperature range, the reaction may be slowed by lack of solubility of lithium sulfide and sulfur. If the temperature is too high, the desired lithiated product may not be stable and may be consumed by side reactions. Of the tested solvents acetonitrile is preferred as having the best solubility and boiling point characteristics.

A variety of metal oxides are suitable for use. Particularly preferred are the various vanadium oxides and lithium vanadium oxides. Manganese dioxide, manganese oxide, chromic oxide, niobium pentoxide, tantalum pentoxide, molybdenum oxides, tungsten trioxide and lithium co-oxides of these elements are among the other metal oxides of use with the present invention. However, transition elements other than those in the first series (element 21 to 30) are generally too massive to result in high energy storage batteries. Further, chromium is generally considered to be too toxic. This leaves vanadium compounds as the presently preferred metal oxides.

EXAMPLE 1

Lithiated Vanadium Pentoxide

Vanadium pentoxide ($V_2O_5$), 3.03 g, and $Li_2S$, 1.15 g, were mixed in 60 ml of diglyme (diethyleneglycol dimethyl ether). The resulting mixture was refluxed at a temperature of about 160° C. under argon for 17 hr. The mixture was then filtered and the product, a black solid, was washed with tetrahydrofuran (THF) and dried at ambient temperature under argon.

The product was ground in a ball mill to reduce the particle size to to the range of 1–10 μm This material was then used to create a coating emulsion. A solid mixture of lithiated text material (60% by weight), acetylene carbon black (30% by weight) as a conductor, and Kynar 2801 (vinylidene fluoride resin) (10% by weight) as a binder. The solids were suspended in acetone which dissolves the resin. The emulsion was then coated onto an aluminum foil substrate to create a cathode material. A test battery was assembled using a 2 cm² cathode, a polypropylene separator, an a lithium metal anode. The electrolyte consisted of a 1 M solution of $LiPF_6$ in a 50/50 volume % mixture of ethylene carbonate and dimethyl carbonate. The resulting battery was repeatedly charged and discharged using a current of 0.35 mA. A variety of other coating emulsions are usable with the lithiated materials of the current invention. The mixture should consist of a conductive material (e.g., carbon black or graphite) and a suitable binder (usually organic). It is important to select a binder that will not be dissolved by the electrolyte.

Figure 1:
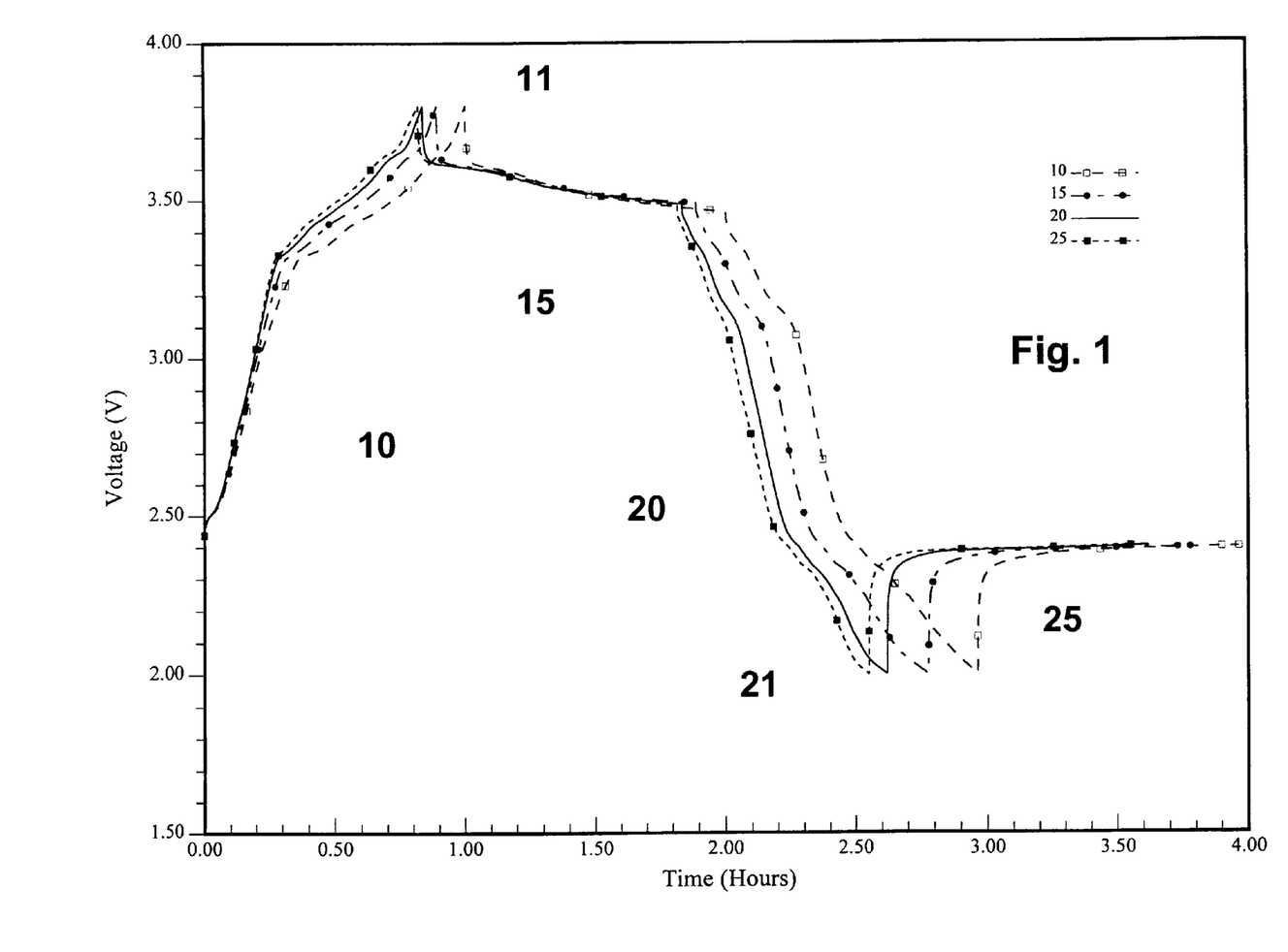
FIG. 1 shows voltage data resulting from constant current charging/discharging cycling of a battery containing lithiated vanadium pentoxide made according to the present invention.

FIG. 1 shows the cycling curves for this battery. The plot shows voltage versus time for a number of charge/discharge cycled (see legend). All of the figures were produced with a special battery test fixture in which the current at each portion of the charge/discharge cycle was held constant. A left-hand portion of the trace shows the charging portion 10 or the cycle. The voltage rises steadily and ultimately reaches a peak 11 at about 3.8 volts. A relatively flat plateau 15 represents a one hour "rest" during which the battery undergoes neither appreciable charging nor discharging. Following this is a discharge portion 20 wherein the battery is steadily discharged. At the end 21 of the discharge cycle, the batter is again allowed to "rest" and its voltage recovers to a plateau value 25. Significantly, the third discharge cycle had a discharge capacity of 218 mAh/g (about 610 mWh/g), a figure well above the capacity of many lithiated cathode materials.

EXAMPLE 2

Lithiated $LiV_5O_{13}$ $LiV_5O_{13}$ was dried at 125° C. under a vacuum and 3.00 g was mixed with $Li_2S$, 0.86 g in 50 ml of THF. The mixture was refluxed under argon for 19 hr. The resulting mixture was filtered and the product, a black solid, was washed repeatedly with THF and dried at ambient temperatures under argon.

Figure 2:
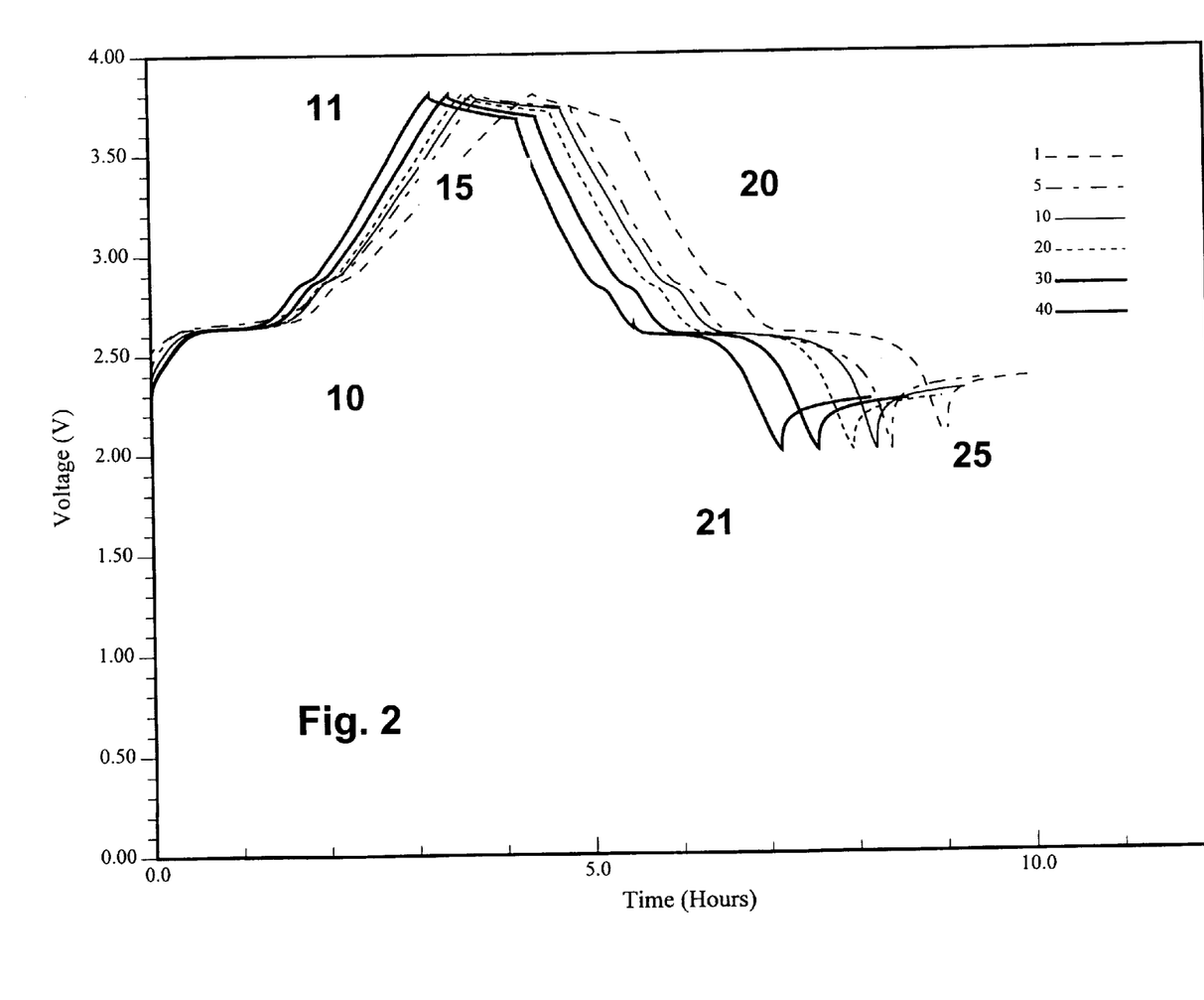
FIG. 2 shows voltage data resulting from constant current charging/discharging cycling (legend indicates cycle number) of a battery containing lithiated $LiV_5O_{13}$ made according to the present invention.
Figure 3:
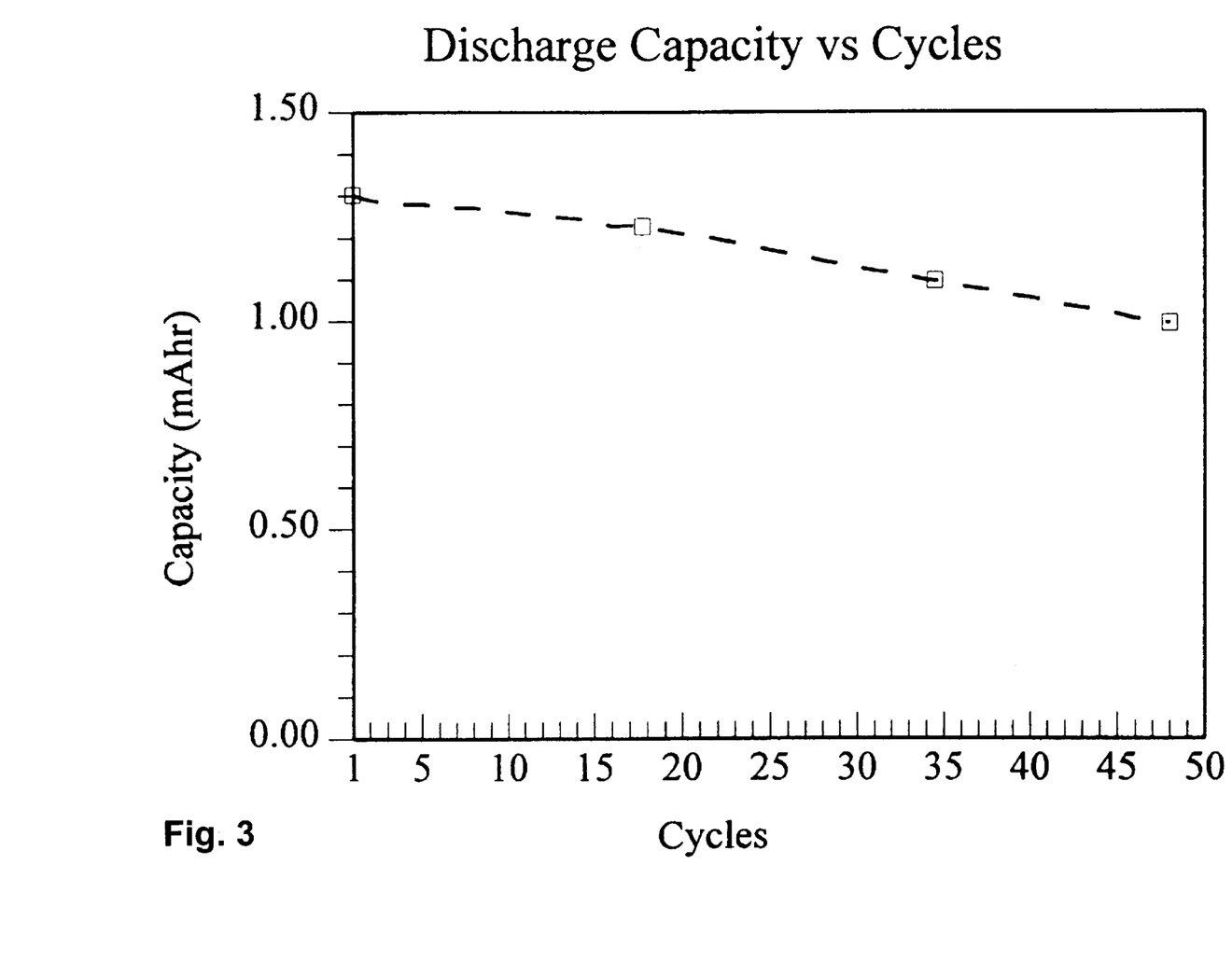
FIG. 3 shows the changes in energy capacity as related to charging/discharging cycles of the material of FIG. 2.

A coating emulsion was produced and used to make cathode material as in Example 1, above. The charging and discharging data for this material are shown in FIG. 2. The first cycle charge showed a capacity of 242 mAh/g (about 677 mWh/g) while the third discharge showed a capacity of 206 mAh/g (about 575 mWh/g). This pattern is substantially similar to that shown in FIG. 1; however, the first charge cycle shows a flatter voltage slope than subsequent cycles. FIG. 3 shows the changes in measured capacity over 50 charge/discharge cycles. It can be seen that capacity slowly decreased with increasing cycles.

EXAMPLE 3

Lithiated Electrolytic Manganese Dioxide (EMD)

EMD, 8.00 g, and $Li_2S$, 1.06 g, were refluxed in 75–85 ml of anhydrous acetonitrile under argon for 12 hr. The black solid product material was collected by filtration and washed with an additional 100 ml of anhydrous acetonitrile and dried under argon.

Figure 4:
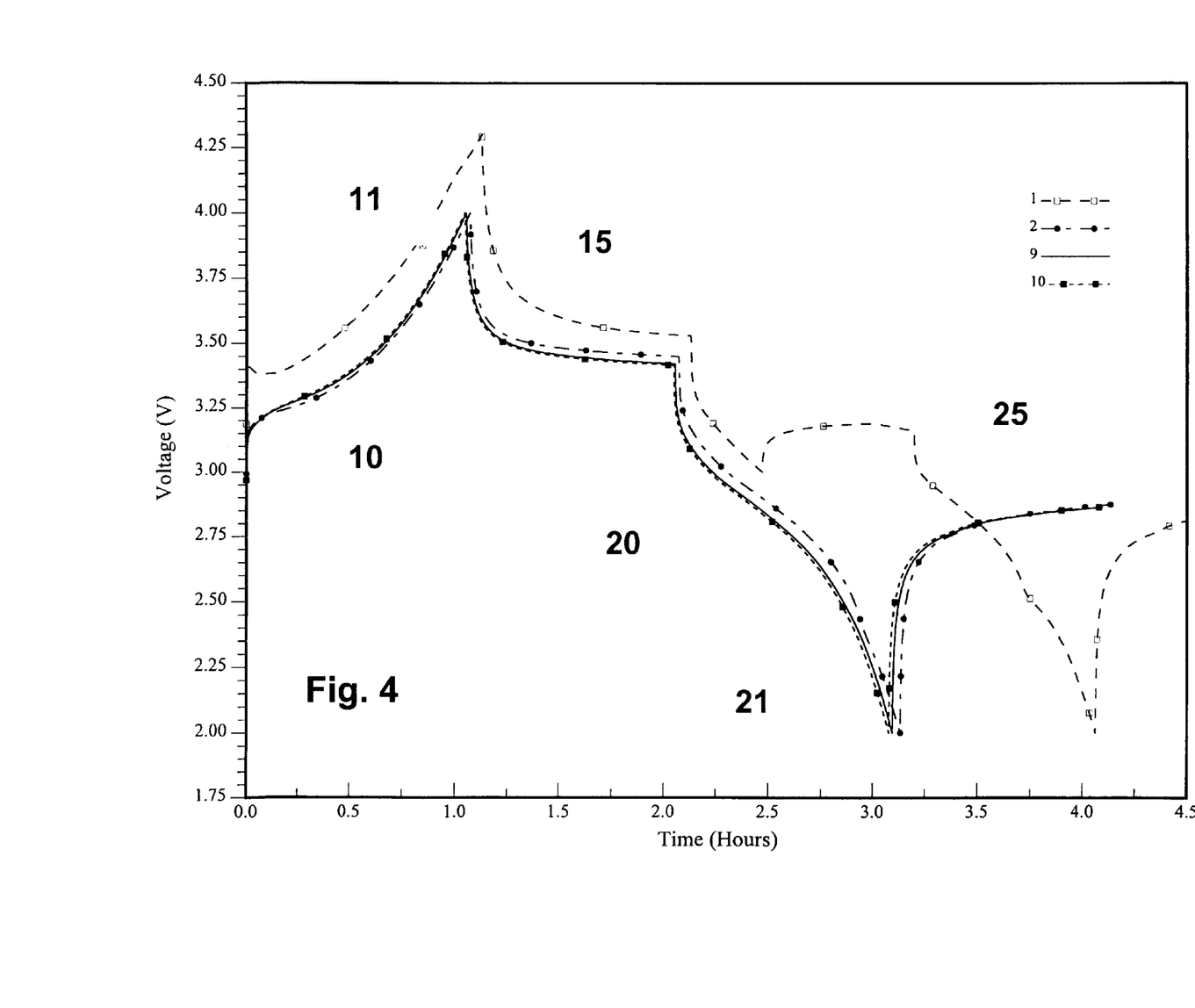
FIG. 4 shows voltage data resulting from constant current charging/discharging cycling (legend indicates cycle number) of a battery containing lithiated electrolytic manganese dioxide made according to the present invention.
Figure 5:
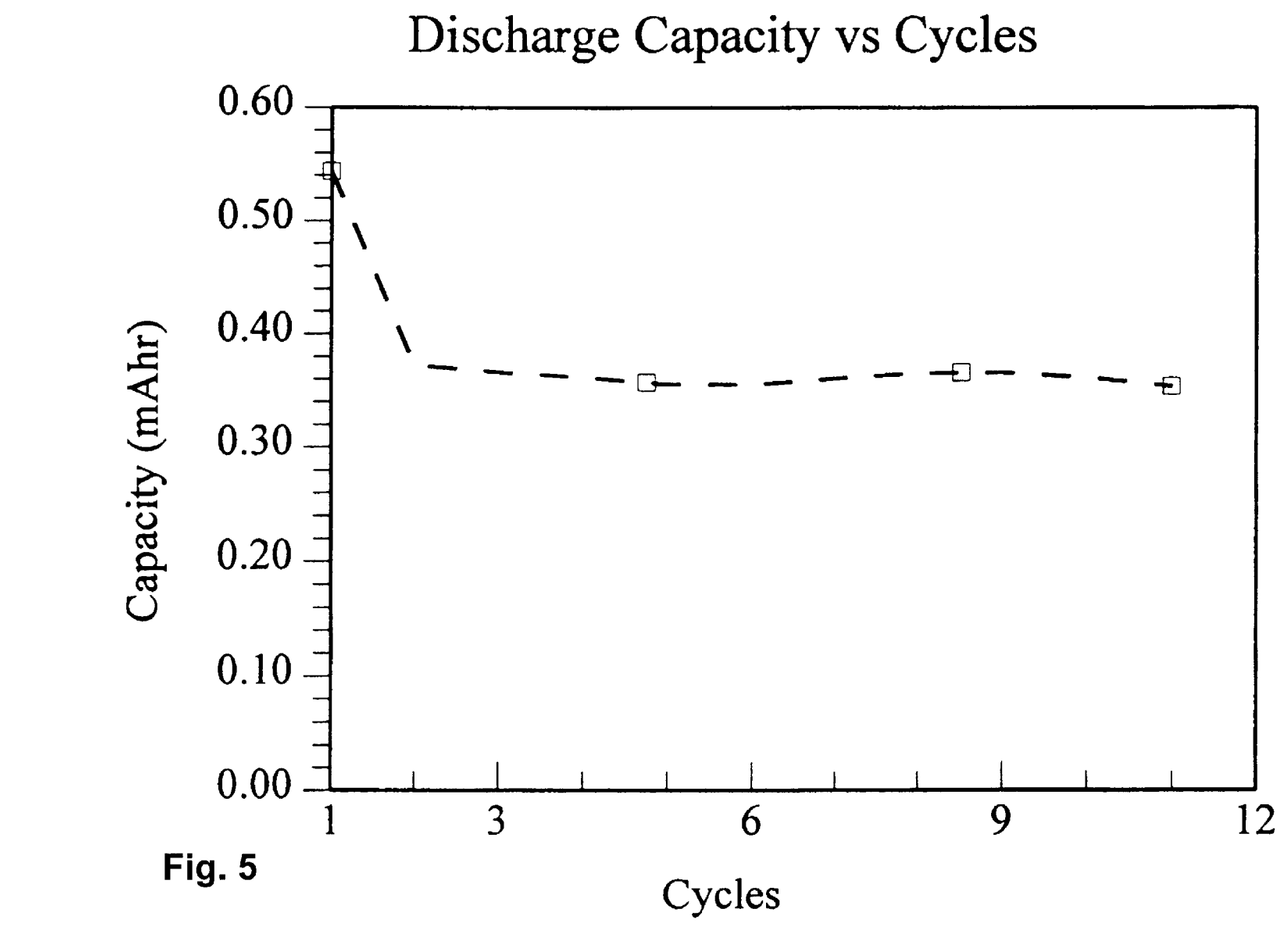
FIG. 5 shows the changes in energy capacity as related to charging/discharging cycles of the material of FIG. 4.

A coating emulsion and cathode was produced and tested as in Example 1. The resulting battery was cycled over a 4.0–2.0 V range. The first cycle charge capacity was 74 mAh/g (about 207 mWh/g) while the third cycle discharge capacity was 69 mAh/g (about 193 mWh/g). The test results are shown in FIG. 4. Again, the profiles are relatively similar to the previous examples except that the voltage peak 11 is very pronounced. The overall capacity of batteries produced from this material is lower, but FIG. 5 shows that after the first cycles, the capacity is stable.

EXAMPLE 4

Lithiated Vanadium Oxide ($V_6O_{13}$)

Figure 6:
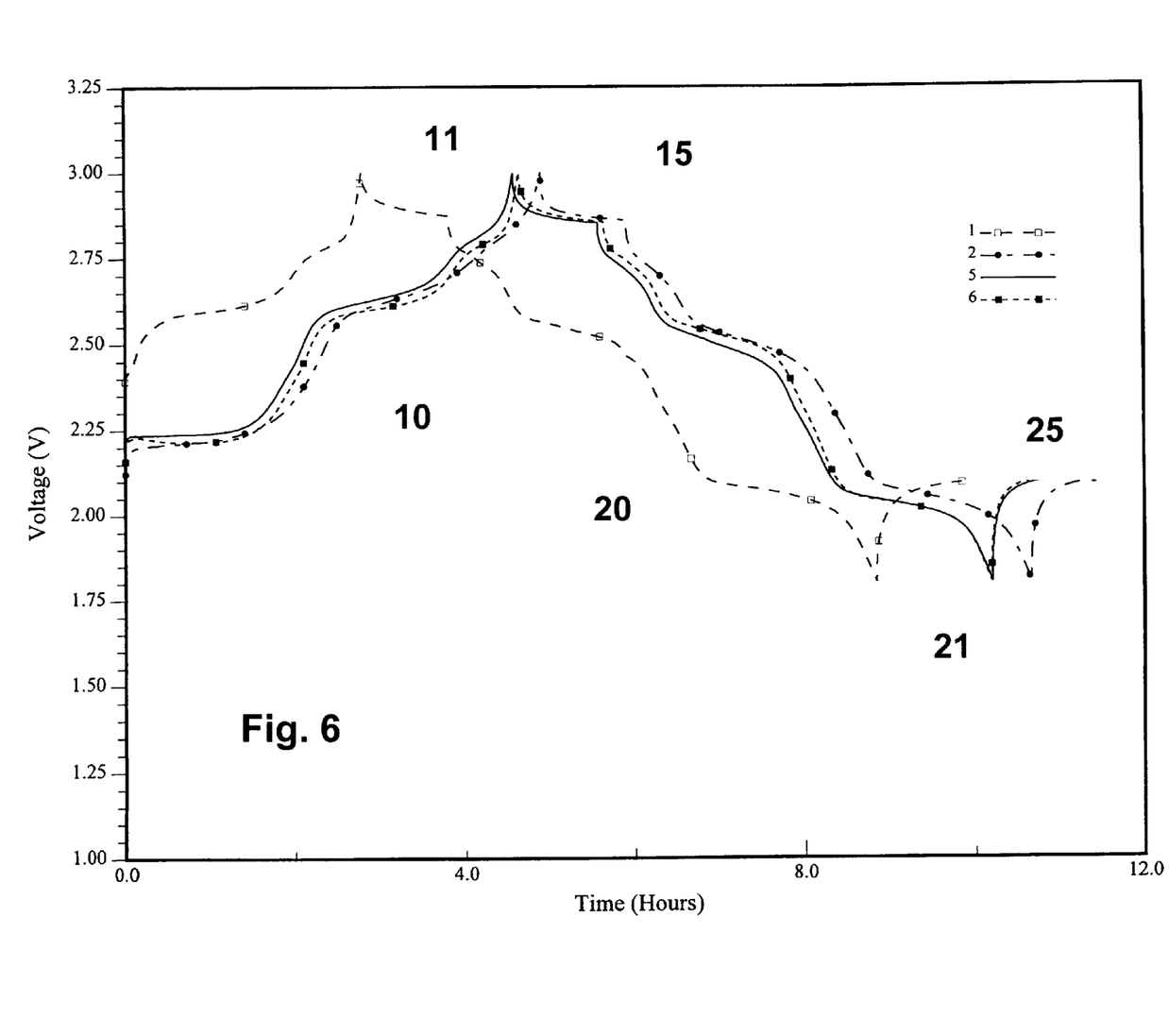
FIG. 6 shows voltage data resulting from constant current charging/discharging cycling (legend indicates cycle number) of a battery containing lithiated vanadium oxide made according to the present invention.
Figure 7:
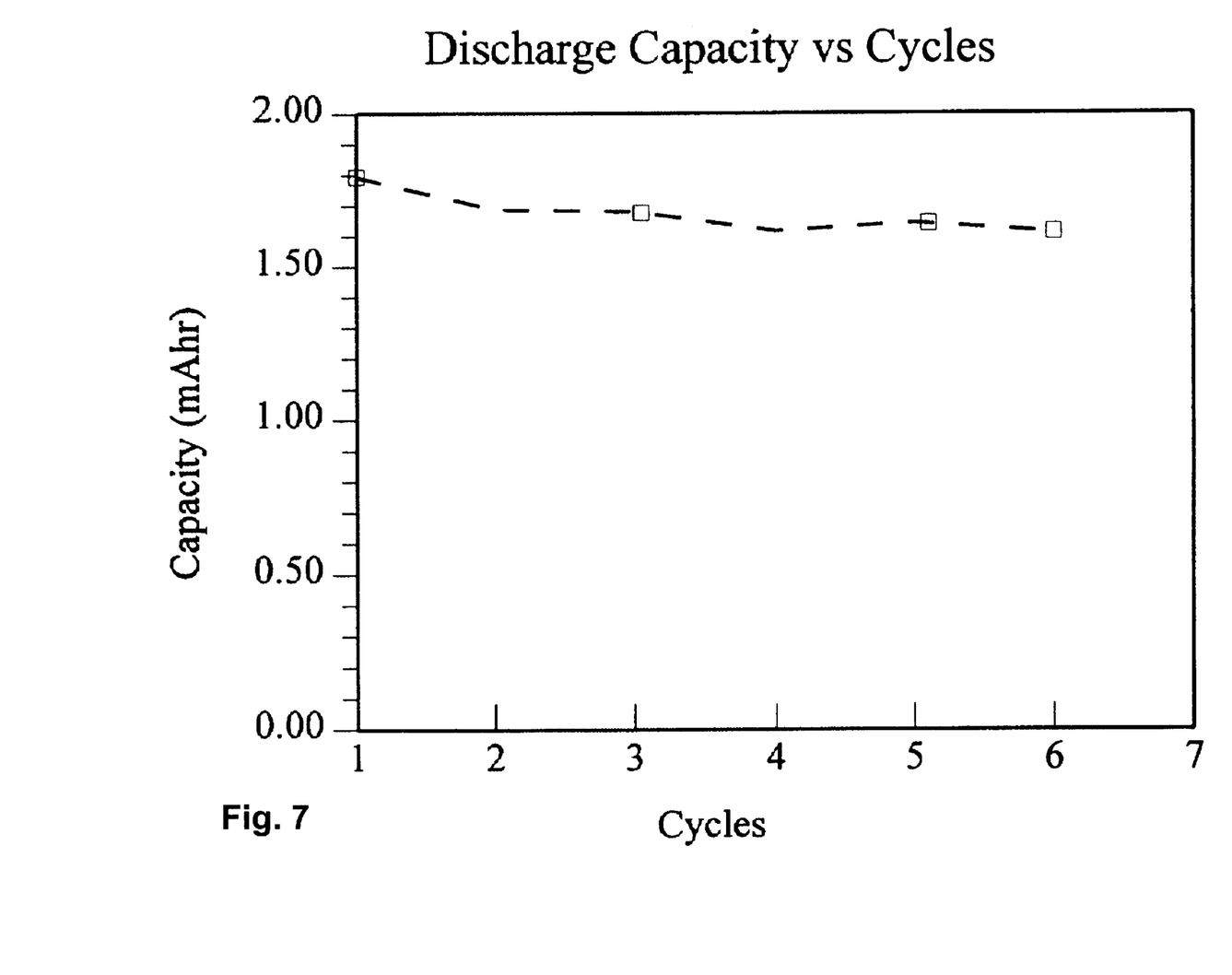
FIG. 7 shows the changes in energy capacity as related to charging/discharging cycles of the material of FIG. 6.

Vanadium oxide ($V_6O_{13}$), 4.00 g was refluxed with $LiS_2$, 1.43 g, in 300 ml of anhydrous acetonitrile under argon for 12 hr. The black, insoluble product was collected by filtration, washed with 600 ml of anhydrous acetonitrile and dried under argon. The material was coated onto aluminum as in Example 1 and batteries were prepared as in Example 1. The electrochemical cells were cycled over a 3.0–1.8 V range at a rate of approximately five hours for each charge or discharge. The results are shown in FIG. 6. After the initial charge cycle the charge capacity was 132 mAh/g (about 370 mWh/g); the third cycle discharge capacity was 226 mAh/g (about 633 mWh/g). FIG. 7 shows that the capacity remained fairly stable from cycle to cycle.

EXAMPLE 5

Preparation of $LiV_3O_{7.9}$

In the course of the present invention it was discovered that a particular lithium vanadium co-oxide gave especially favorable results. This material is prepared by combining 4 moles of $V_2O_5$ with 3 moles of $LiOH \cdot H_2O$ with 1 mole of $NH_4CO_2CH_3$ (ammonium acetate). The materials were ground thoroughly in a mortar, and the yellow powder was transferred to an alumina crucible and heated in air at 585° C. for 12–16 hr. After slow cooling, the material was reground in a mortar after which the heating cycle in the crucible was repeated. Numerous batches of this material, herein called "431-T" were prepared. Table 1 summarizes the recipes used for seven such batches. The results were substantially the same from batch to batch. Analysis by x-ray diffraction confirmed the formula of the material as $LiV_3O_{7.9}$.

TABLE 1

| Code # | V2O5 | LiOH | Ammonium Acetate |
|---|---|---|---|
| BC491-B | 30.0 g | 5.19 g | 3.18 g |
| BC510 | 80.0 g | 13.84 g | 8.48 g |
| BC566-A | 10.0 g | 1.73 g | 1.06 g |
| BC590 | 40.0 g | 6.92 g | 4.24 g |
| BC612 | 225.0 g | 38.93 g | 23.85 g |
| BC623-A | 100.0 g | 17.30 g | 10.59 g |
| BC656 | 200.0 g | 34.60 g | 21.20 g |

EXAMPLE 6

Lithiation of $LiV_3O_{7.9}$ (431-T)

Figure 8:
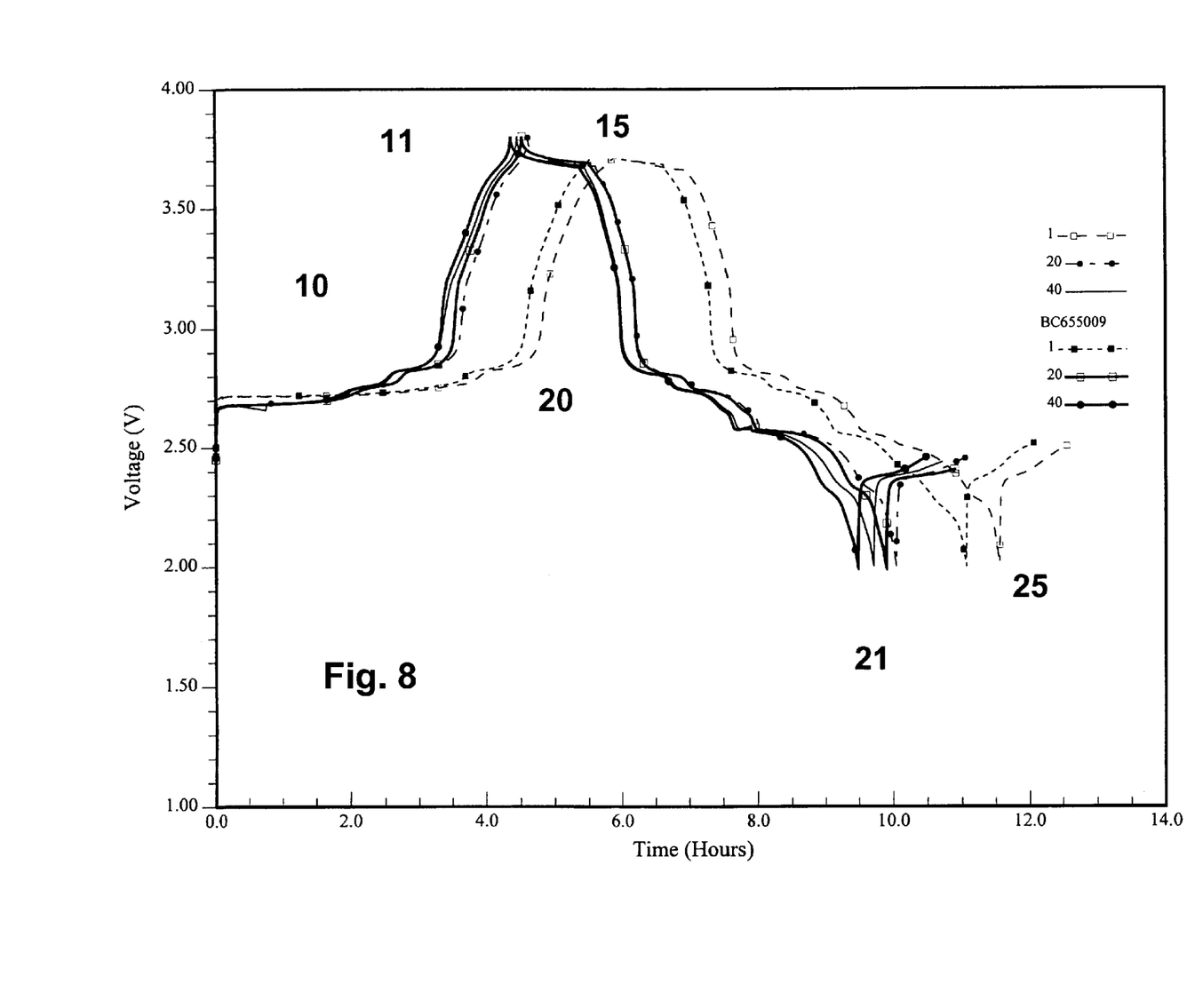
FIG. 8 shows voltage data resulting from constant current charging/discharging cycling (legend indicates cycle number) of a battery containing lithiated $LiV_3O_{7.9}$ made according to the present invention.
Figure 9:
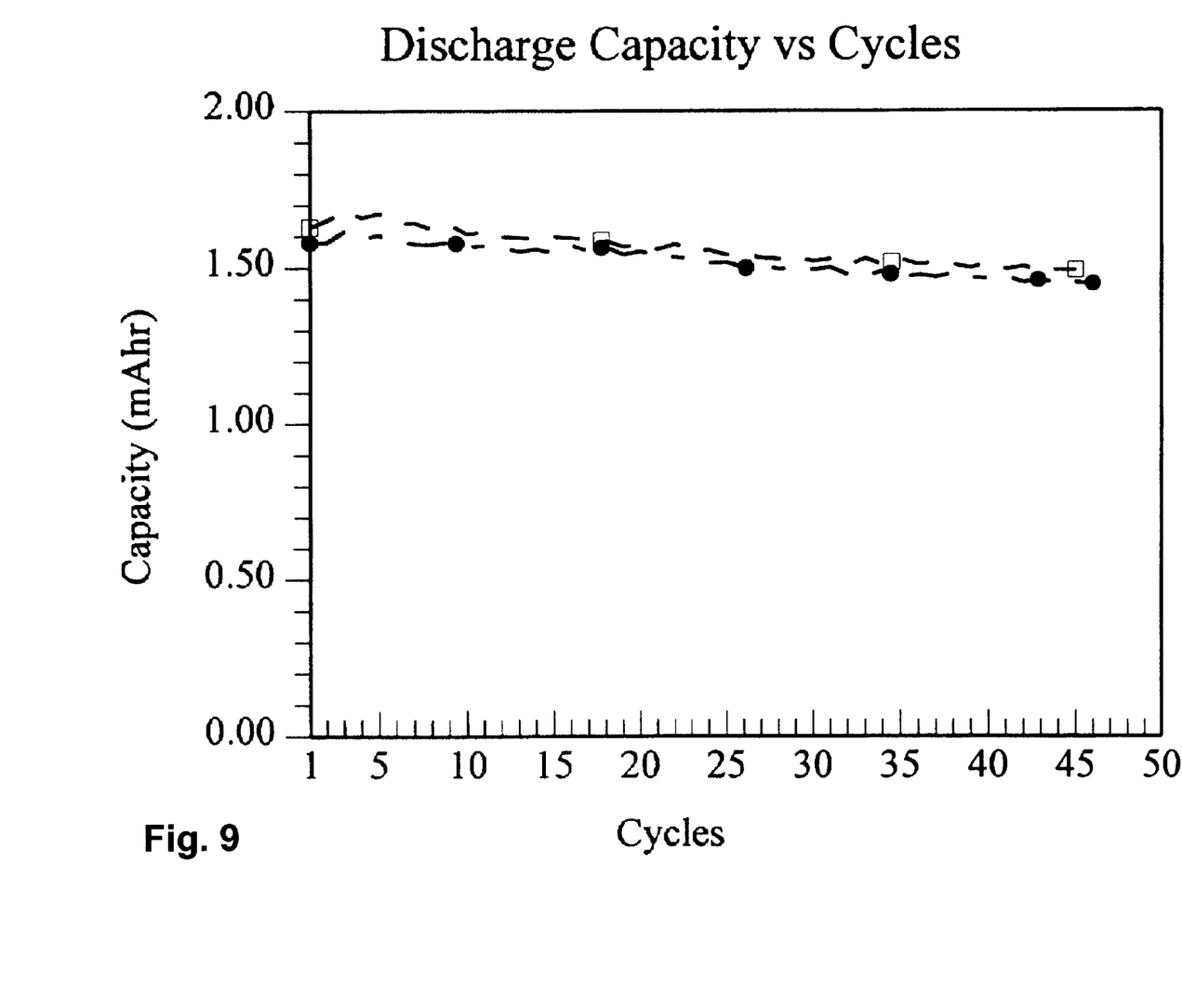
FIG. 9 shows the changes in energy capacity as related to charging/discharging cycles of the material of FIG. 8.

Lithium vanadium oxide ($LiV_3O_{7.9}$), 20.00 g was refluxed with $Li_2S$, 5.72 g, in 300 ml of anhydrous acetonitrile under argon for 12 hr. The black, insoluble product was collected by filtration, washed with 600 ml of anhydrous acetonitrile and dried under argon. The material was coated onto aluminum as in Example 1 and batteries were prepared as in Example 1. The electrochemical cells were cycled over a 3.8–2.0 V range at a rate of 4.6 to 4.8 hours for each charge or discharge. The results are shown in FIG. 8. After the initial charge cycle the charge capacity was 285 mAh/g (about 798 mWh/g); the third cycle discharge capacity was 234 mAh/g (about 655 mWh/g). The charge/discharge figure shows a somewhat steeper charge 10 and discharge slope 20 than some of the other materials. The figure also shows two different batteries (A and B) made from the same batch. FIG. 9 shows that the capacity remained quite stable from cycle to cycle for 50 cycles of both A and B. All in all 431T lithiated by the present process shows exceptional battery properties. Batteries made from the other 431T batches shown in Table 1 gave essentially similar results with cycle life up to 100 complete cycles. These test numbers are predictive of long and robust battery life.

In addition to the equivalents of the claimed elements, obvious substitutions now or later known to one with ordinary skill in the art are defined to be within the scope of the defined elements. The claims are thus to be understood to include what is specifically illustrated and described above, what is conceptually equivalent, what can be obviously substituted and also what essentially incorporates the essential idea of the invention. Those skilled in the art will appreciate that various adaptations and modifications of the just-described preferred embodiment can be configured without departing from the scope and spirit of the invention. The illustrated embodiment has been set forth only for the purposes of example and that should not be taken as limiting the invention. Therefore, it is to be understood that, within the scope of the appended claims, the invention may be practiced other than as specifically described herein.

What is claimed is:

1. A method for converting a metal oxide into a lithiated material for use in an electrochemical cell comprising the steps of:

adding lithium sulfide to an organic solvent in which lithium sulfide and elemental sulfur are soluble but in which the metal oxide is essentially insoluble;

contacting the metal oxide with said lithium sulfide in the organic solvent, whereby the metal oxide is converted into the lithiated material and resulting elemental sulfur is dissolved by the organic solvent; and removing the lithiated material from the organic solvent.

2. The method of claim 1, wherein the metal oxide is selected from a group consisting of $V_2O_5$, $LiV_5O_{13}$, $MnO_2$, $V_6O_{13}$, and $LiV_3O_{7.9}$.

3. The method of claim 1, wherein the organic solvent is selected from a group consisting of acetonitrile, tetrahydrofuran, ethylene glycol dimethyl ether, diethyleneglycol dimethyl ether, diethyleneglycol diethyl ether, triethylene glycol dimethyl ether, tetraethylene glycol dimethyl ether, and poly(ethylene glycol) dimethyl ether.

4. The method of claim 1, wherein the contacting occurs at a temperature between 60° C. and 100° C.

5. A method for converting a vanadium oxide or a lithium vanadium oxide into a lithiated material for use in an electrochemical cell comprising the steps of:

adding lithium sulfide to an organic solvent in which lithium sulfide and elemental sulfur are soluble but in which the vanadium oxide or the lithium vanadium oxide is essentially insoluble;

contacting the vanadium oxide or the lithium vanadium oxide with said lithium sulfide in the organic solvent, whereby the vanadium oxide or the lithium vanadium oxide is converted into the lithiated material and resulting elemental sulfur is dissolved by the organic solvent; and removing the lithiated material from the organic solvent.

6. The method of claim 5, wherein the metal oxide is selected from a group consisting of $V_2O_5$, $LiV_5O_{13}$, $V_6O_{13}$, and $LiV_3O_{7.9}$.

7. The method of claim 5, wherein the organic solvent is selected from a group consisting of acetonitrile, tetrahydrofuran, ethylene glycol dimethyl ether, diethyleneglycol dimethyl ether, diethyleneglycol diethyl ether, triethylene glycol dimethyl ether, tetraethylene glycol dimethyl ether, and poly(ethylene glycol) dimethyl ether.

8. The method of claim 5, wherein the contacting occurs at a temperature between 60° C. and 100° C.

9. A method for converting $LiV_3O_{7.9}$ into lithiated $LiV_3O_{7.9}$ for use in an electrochemical cell comprising the steps of:

adding lithium sulfide to an organic solvent in which lithium sulfide and elemental sulfur are soluble but in which the $LiV_3O_{7.9}$ is essentially insoluble;

contacting the $LiV_3O_{7.9}$ with said lithium sulfide in the organic solvent;

refluxing the organic solvent in an inert gas atmosphere, whereby the $LiV_3O_{7.9}$ is converted into the lithiated $LiV_3O_{7.9}$ and resulting elemental sulfur is dissolved by the organic solvent; and removing the lithiated $LiV_3O_{7.9}$ from the organic solvent.

10. The method of claim 9, wherein the organic solvent is selected from a group consisting of acetonitrile, tetrahydrofuran, ethylene glycol dimethyl ether, diethyleneglycol dimethyl ether, diethyleneglycol diethyl ether, triethylene glycol dimethyl ether, tetraethylene glycol dimethyl ether, and poly(ethylene glycol) dimethyl ether.

11. The method of claim 9, wherein the contacting occurs at a temperature between 60° C. and 100° C.

* * * * *